United States Patent [19]

Werst

[11] 4,292,800
[45] Oct. 6, 1981

[54] TEXTILE MACHINE DATA LINK APPARATUS

[75] Inventor: Lyman L. Werst, Acton, Mass.

[73] Assignee: Parks-Cramer Company, Fitchburg, Mass.

[21] Appl. No.: 79,798

[22] Filed: Sep. 28, 1979

[51] Int. Cl.³ .................... D01H 13/32; H03K 13/24
[52] U.S. Cl. ........................................ 57/264; 57/81; 57/265; 375/66; 375/81
[58] Field of Search ................ 57/81, 264, 265; 375/66, 81

[56] References Cited

U.S. PATENT DOCUMENTS

| | | | |
|---|---|---|---|
| 3,162,812 | 12/1964 | Stone | 375/66 |
| 3,449,691 | 6/1969 | Pasternack et al. | 375/81 X |
| 3,523,413 | 8/1970 | Ford et al. | 57/265 |
| 3,636,454 | 1/1972 | Pasternack et al. | 375/81 |
| 3,680,298 | 8/1972 | Saunders | 57/265 |
| 3,806,918 | 4/1974 | Cauthron et al. | 375/81 X |

Primary Examiner—Donald Watkins

[57] ABSTRACT

An improvement in a data link, such as is used for continuously transferring data concerning operations of textile yarn forming machines such as ring spinning frames, wherein a transmitter and receiver each use particular combinations of oscillators and phase locked loop circuits to function as frequency synthesizers.

11 Claims, 4 Drawing Figures

TEXTILE MACHINE DATA LINK APPARATUS

FIELD AND BACKGROUND OF INVENTION

It has been proposed heretofore that information regarding the operating conditions of a group of ring spinning machines in a textile mill be gathered for use in tending such machines and more efficiently managing the manufacture of yarns by such machines. For example, it has been disclosed in such prior patents as Ford et al U.S. Pat. No. 3,523,413; Bryan Jr. et al U.S. Pat. No. Re. 27,501; and Saunders U.S. Pat. No. 3,680,298, owned in common with the present invention, that at least one traveling unit be supported for travel along a predetermined path of travel for traversing one or more ring spinning machines and that information be gathered from detectors traveling with such a traveling unit. To the extent that the disclosures of the aforementioned patents are necessary or appropriate to an understanding of present invention, those prior patents are hereby incorporated by reference into the present description. As will be apparent to persons skilled in the applicable arts from a study of the aforementioned patents, a data system may be provided in connection with a group of ring spinning machines which is responsive to detectors on a traveling unit for determining the condition of each machine of a traversed group of machines.

Information gathering and processing apparatus and methods of the types described in the aforementioned patents have achieved some acceptance in textile mill operations and, as so accepted, have included frequency modulation transmitters and receivers of the type generally described in aforementioned Saunders U.S. Pat. No. 3,680,298 in column 7 at line 45. The data link means provided by a correlated transmitter and receiver of the type described in the aforementioned Saunders U.S. Pat. No. 3,680,298 additionally will be recognized as having utility outside the specific field of use to which the present description is directed.

As the development of such textile machine information gathering apparatus and methods has proceeded, it has been realized that efficient and accurate communication of data would be improved by enhancing performance of the data link means provided by a transmitter and receiver. In particular, such enhanced performance has been contemplated as being achievable by means of more accurate control over frequency bands employed for communication. Such accurate control, when accomplished, has additionally been contemplated as opening the possibility of reduced band width requirements, whereby greater "packing" of channels within particular broad band widths of frequencies would become attainable.

BRIEF DESCRIPTION OF INVENTION

With the above discussion in mind, it is an object of the present invention to enhance the accuracy of control over frequency band widths used for frequency modulation communication of binary data. In realizing this object of the present invention, oscillators and phase locked loop circuits cooperate in particular manners to function as frequency synthesizers. In particular, both a transmitter means used and a receiver means used in a data link include a frequency synthesizer section formed by cooperating oscillators and phase locked loop circuits.

Yet a further object of the present invention is to facilitate reduction and matching of frequency band widths used for frequency modulated transmission of data. In realizing this object of the present invention, provision is made for ready programming of phase locked loop circuits so as to accommodate selection of a channel of frequencies for operation of a data link. Particularly with respect to a receiver, the programming means selects a center frequency and the receiver shifts to operating frequencies above and below the center frequency and indicative of binary data. By means of programmed selection of a channel of frequencies for emission from a transmitter, proper matching of the transmitter and receiver which together form a data link is accomplished.

BRIEF DESCRIPTION OF FIGURES

Some of the objects of the invention having been stated, other objects will appear as the description proceeds, when taken in connection with the accompanying drawings, in which.

DETAILED DESCRIPTION OF INVENTION

While the present invention will be described hereinafter with particular reference to the accompanying drawings, it is to be understood at the outset of the following description that persons skilled in the arts applicable to the present invention will be enabled by this disclosure to construct apparatus and practice methods which embody the present invention and yet take forms which may differ from those here particularly described and shown. Accordingly, the description which follows is to be understood broadly as an enabling disclosure directed to persons skilled in the appropriate arts, and is not to be taken as being restrictive upon the scope of the present invention.

Figure 1:
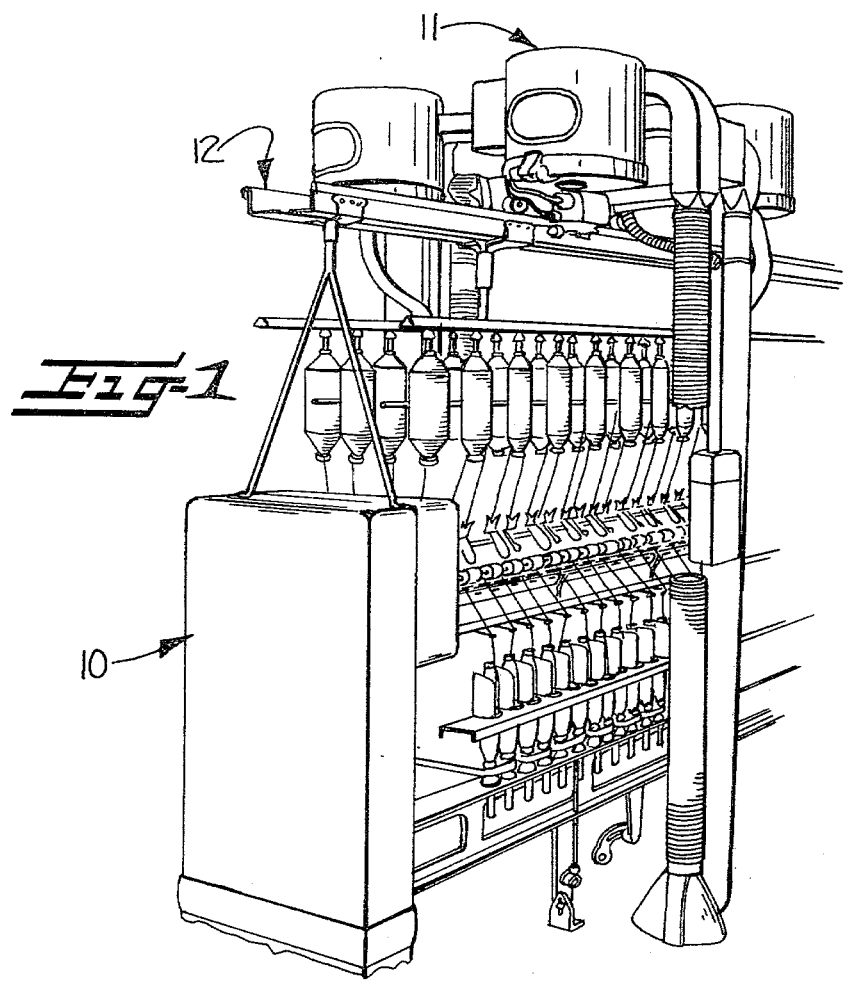
FIG. 1 is a perspective view of a textile mill incorporating an installation of an apparatus in accordance with the present invention.

Referring now more particularly to the drawings, the present invention is contemplated as being particularly useful in connection with a plurality of ring spinning machines, one of which is generally indicated at 10 (FIG. 1), arranged in a plurality of rows in a textile mill. One or more traveling units, one of which is generally indicated at 11 in FIG. 1, are supported for traversing the textile machines 10 along predetermined paths of travel. In the drawings, and consistent with the disclosures of the aforementioned related prior patents, the traveling units 11 are substantially identical to the fourth embodiment disclosed in U.S. Pat. No. 3,304,571 owned in common with the present invention. As disclosed in that patent, each of the traveling units 11 is supported for movement along a track 12 extending above the spinning machines 10. Conventionally, such a track describes a closed pattern of so-called H-loop configuration. Each traveling unit includes drive means driving it in movement along the track so as to traverse the machines in a circuit automatically and at predetermined intervals.

The ring spinning machines 10 include elements or operating instrumentalities (not shown) for receiving strand material in a form known as roving, drawing or attenuating the strand material, and twisting or spinning the attenuated strand material to form yarn. The operating instrumentalities of a ring spinning machine are well known to persons skilled in the applicable technical arts, and the cooperation therewith of detectors moving with the traveling unit 11 for detecting broken yarns or "ends down" will be clear from the aforementioned related prior patents and the additional prior patents there referred to.

In order to monitor the conditions of ends of strand material normally being formed by a traversed machine 10, detectors (not shown) are mounted on the traveling unit 11 in accordance with the teachings of the aforementioned related United States patents. A data system is provided which is responsive to the detectors for determining the ends down condition of the traversed machine from the conditions of the monitored ends and may include other and further apparatus such as are disclosed in the related prior patent. As will be understood, the data system includes processor means which operatively communicate with sensor means for determining from signals received therefrom the operating conditions of respective ones of the machines and generating displays of an appropriate type.

Figure 2:
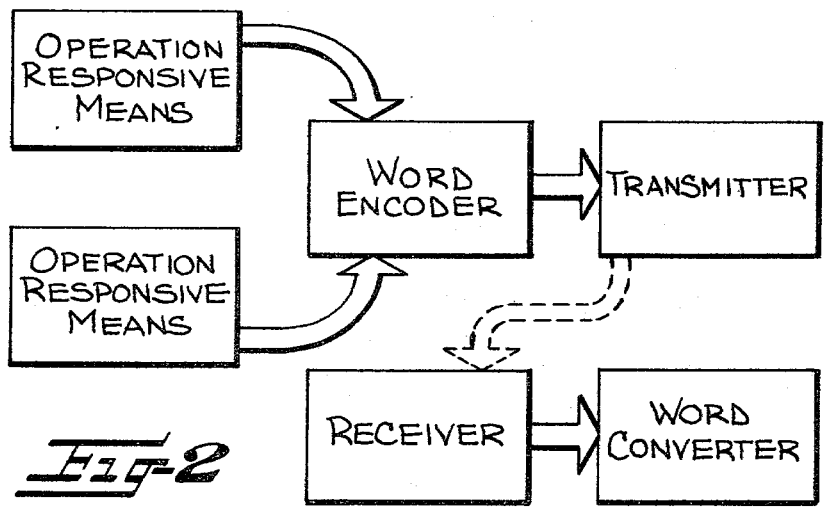
FIG. 2 is a block diagram of an application of the data link of the present invention.

In accordance with the present invention, operative communication is established by means of a data link means communicating binary information and particularly a data link arrangement (FIG. 2) having a transmitter means and a receiver means with particular characteristics now to be described.

Figure 3:
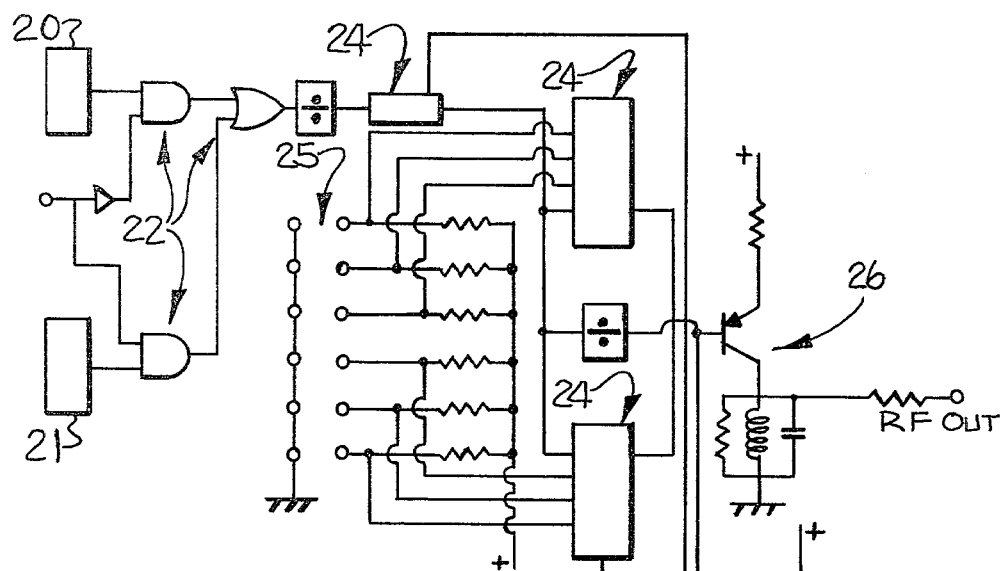
FIG. 3 is a schematic diagram of a transmitter as incorporated in the apparatus of the present invention.

Referring now more particularly to FIG. 3, transmitter means in accordance with the present invention has first and second oscillators 20, 21 generating signals of predetermined first and second frequencies. The oscillators 20, 21 supply signals to data signal input gates generally indicated at 22. Preferably each of the oscillators 20, 21 is a crystal oscillator capable of maintaining with high accuracy the frequency of the signals supplied. The oscillators are selected or are tuned to deliver signals separated by less than two-tenths of one percent of the frequency supplied, which typically may be on the order of six megahertz.

The data signal input gates generally indicated at 22, while being operatively connected to the oscillators 20, 21, are also connected to an output from a suitable encoder such as the circuit arrangement of FIG. 5 of Saunders U.S. Pat. No. 3,680,298. The data signal input gates 22 operate for selectively passing signals of one of the frequencies generated by the oscillators 20, 21 in response to keying signals from the encoder, in a manner which is generally known to persons skilled in the applicable arts as frequency shift keying of binary data. While the general characteristics of frequency shift keying of binary data are known to persons skilled in the applicable arts, it is to be noted that the particular cooperation here being described is contemplated as being novel.

More particularly, the transmitter includes a phase locked loop circuit, generally indicated at 24, operatively connected to the gates 22 for receiving signals past therethrough as a reference signal. The phase locked loop circuit 24 will generate an output signal of a predetermined frequency correlated to the reference signal. The specific frequency generated by the phase locked loop circuit may vary from the specific frequency of the first and second oscillators 20, 21 by reason of division or multiplication of the frequencies being operated upon. Frequency division and circuits appropriate for such division are generally known to persons skilled in the applicable arts. As such skilled persons will know, such variation in frequencies will cause the upper and lower limit frequencies as established by the oscillators to be changed and will change the absolute frequency interval therebetween. However, the separation of those signals expressed as a percentage of the frequency supplied will remain the same.

In accordance with particular characteristics of the present invention, the phase locked loop circuit 24 comprises programming means by which a channel of frequencies for operation of the transmitter means may be selected. More particularly, the transmitter means has, in the form illustrated, a "plug board" connection generally indicated at 25, by means of which a particular channel of frequencies encompassing a percentage frequency separation comparable to that between the first and second oscillators may be selected. The particular significance of the programming means, in the overall combination of a data link in accordance with this invention, will be pointed out more fully hereinafter.

The first and second oscillators 20, 21 and the phase locked loop circuit generally indicated at 24 cooperate in the transmitter of the present invention to function as a frequency synthesizer. More particularly, the frequency synthesizer will synthesize an output signal amounting to the side band frequencies of a frequency modulated signal which carries binary information.

Finally, the transmitter includes a radio frequency output means generally indicated at 26 and operatively connected to the phase locked loop circuit 24 for emitting a radio frequency signal in response to and at a frequency determined by the output signal from the phase locked loop circuit. In the particular form illustrated, a balanced output is accomplished by providing two radio frequency outputs, bearing a predetermined 180 degree phase relationship one to another. This is deemed desirable in the particular environment described in the aforementioned related patents including Saunders U.S. Pat. No. 3,680,298.

Figure 4:
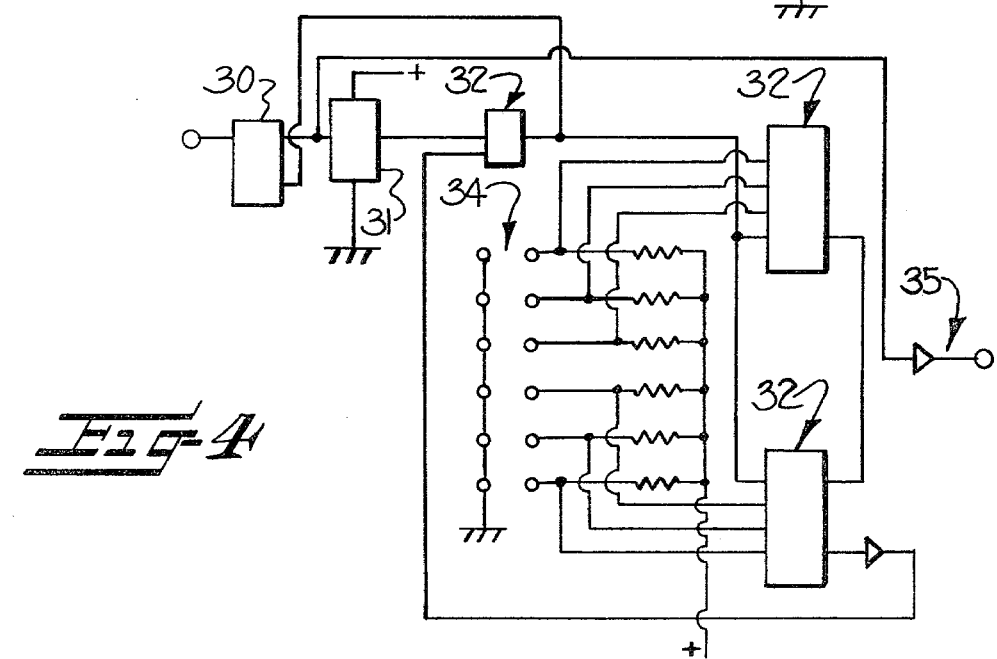
FIG. 4 is a schematic diagram of a receiver incorporated in the apparatus of the present invention.

The companion receiver means in the data link means in accordance with the present invention (FIG. 4) may function in cooperation with circuitry as illustrated in FIG. 7 of Saunders U.S. Pat. No. 3,680,298. As such, the receiver has a radio frequency input means generally indicated at 30 for receiving a radio frequency signal and for generating a control signal therefrom as described more fully hereinafter. The receiver also has a controlled oscillator 31 for generating a signal of controllably variable frequency. The controlled oscillator may take the form of a voltage controlled crystal oscillator of a type generally known to persons skilled in the applicable arts and in which an output frequency may be controllably varied in response to voltages applied.

The receiver additionally includes a phase locked loop circuit 32 operatively connected to the radio frequency input means 30 and to the controlled oscillator 31 for receiving signals generated thereby. The phase locked loop circuit 32 cooperates with the input means in applying a voltage to the controlled oscillator 31 for controllably varying the frequency generated thereby in response to the control signal. As will be appreciated, the controlled oscillator 31 and the phase locked loop circuit 32 cooperate to function as a frequency synthesizer. The receiver frequency synthesizer thus formed shifts from a center frequency to operating frequencies above and below the center frequency in response to the receipt of radio frequency signals carrying binary information. The receiver may properly be viewed as having two phase locked loops, one within the other. For one phase locked loop, the output of the receiver frequency synthesizer is a reference, with the output becoming the control signal to the controlled oscillator. The second phase locked loop, nested within the first, is provided by the circuit 32 functioning as a portion of the frequency synthesizer.

As will be noted, the phase locked loop circuit 32 of the receiver additionally includes programming means 34 for selecting a channel of frequencies for operation of the data link means. The programming means, consistent with that provided in the transmitter described above, preferably comprises a "plug board" by which a manual connection may be made for selecting a center frequency for generation by the receiver phase locked loop circuit 32.

Finally, the receiver includes a data signal output means 35 operatively connected with the phase locked loop circuit 32 for distinguishing as binary data the frequency shifts of signals present in the phase locked loop circuit.

In operation of the data link means contemplated by the present invention, manual selection of common channels of frequencies for operation of the phase locked loop circuits 24, 32 is contemplated as accomplishing highly accurate coupling of a transmitter and a receiver within relatively narrow band widths for frequency shift. As a consequence, "packing" of information into an available range of frequencies may be maximized.

In the drawings and specification, there has been set forth a preferred embodiment of the invention, and although specific terms are employed, they are used in a generic and descriptive sense only and not for purposes of limitation.

That which is claimed is:

1. In the combination of a traveling unit, moving past spindle locations at which ends of yarn normally are formed along one or more textile yarn forming machines and having means responsive to certain operations such as formation of ends of yarn for signaling certain states of said operations such as an end down at a spindle location, with data link means having transmitter means for communicating data concerning said operations, the improvement in said data link means wherein said transmitter means comprises:

first and second oscillators generating signals of predetermined first and second frequencies, data signal input gates operatively connected to said oscillators for selectively passing signals of one of said frequencies and for frequency shift keying binary data, a phase locked loop circuit operatively connected to said gates for receiving signals passed therethrough as a reference signal and for generating an output signal of a predetermined frequency correlated to said reference signal and having programming means for selecting a channel of frequencies for operation of said data link means, said oscillators and said phase locked loop circuit cooperating to function as a frequency synthesizer, and radio frequency output means operatively connected to said phase locked loop circuit for emitting a radio frequency signal in response to and at a frequency determined by said output signal from said phase locked loop circuit.

2. In the combination of an overhead supported traveling pneumatic cleaner, moving past spindle locations at which ends of yarn normally are formed along one or more textile yarn forming machines and having means responsive to certain operations such as formation of ends of yarn for signaling certain states of said operations such as an end down at a spindle location, with data link means having transmitter means for continuously transferring data originating from the traveling pneumatic cleaner, the improvement in said data link means wherein said transmitter means comprises:

first and second oscillators generating signals of predetermined first and second frequencies, data signal input gates operatively connected to said oscillators for selectively passing signals of one of said frequencies and for frequency shift keying binary data, a phase locked loop circuit operatively connected to said gates for receiving signals passed therethrough as a reference signal and for generating an output signal of a predetermined frequency correlated to said reference signal and having programming means for selecting a channel of frequencies for operation of said data link means, said oscillators and said phase locked loop circuit cooperating to function as a frequency synthesizer, and radio frequency output means operatively connected to said phase locked loop circuit for emitting a radio frequency signal in response to and at a frequency determined by said output signal from said phase locked loop circuit.

3. A transmitter for a data link arrangement communicating binary information and comprising:

first and second oscillators generating signals of predetermined first and second frequencies, data signal input gates operatively connected to said oscillators for selectively passing signals of one of said frequencies and for frequency shift keying binary data, a phase locked loop circuit operatively connected to said gates for receiving signals passed therethrough as a reference signal and for generating an output signal of a predetermined frequency correlated to said reference signal and having programming means for selecting a channel of frequencies for operation of said data link means, said oscillators and said phase locked loop circuit cooperating to function as a frequency synthesizer, and radio frequency output means operatively connected to said phase locked loop circuit for emitting a radio frequency signal in response to and at a frequency determined by said output signal from said phase locked loop circuit.

4. In the combination of a traveling unit, moving past spindle locations at which ends of yarn normally are formed along one or more textile yarn forming machines and having means responsive to certain operations such as formation of ends of yarn for signaling certain states of said operations such as an end down at a spindle location, with data link means having receiver means for communicating data concerning said operations, the improvement in said data link means wherein said receiver comprises:

radio frequency input means for receiving a radio frequency signal and for generating a control signal therefrom, a controlled oscillator for generating a signal of controllably variable frequency, a phase locked loop circuit operatively connected to said input means and said oscillator for receiving signals generated thereby and for controllably varying the frequency generated by said oscillator in response to said control signal and having programming means for selecting a channel of frequencies for operation of said data link means, said oscillator and said phase locked loop circuit cooperating to function as a frequency synthesizer, and data signal output means operatively connected to said phase locked loop circuit for distinguishing as binary data the frequency shifts of signals present in said phase locked loop circuit.

5. In the combination of an overhead supported traveling pneumatic cleaner, moving past spindle locations at which ends of yarn normally are formed along one or more textile yarn forming machines and having means responsive to certain operations such as formation of ends of yarn for signaling certain states of said operations such as an end down at a spindle location, with data link means having receiver means for continuously transferring data originating from the traveling pneumatic cleaner, the improvement in said data link means wherein said receiver means comprises:

radio frequency input means for receiving a radio frequency signal and for generating a control signal therefrom, a controlled oscillator for generating a signal of controllably variable frequency, a phase locked loop circuit operatively connected to said input means and said oscillator for receiving signals generated thereby and for controllably varying the frequency generated by said oscillator in response to said control signal and having programming means for selecting a channel of frequencies for operation of said data link means, said oscillator and said phase locked loop circuit cooperating to function as a frequency synthesizer, and data signal output means operatively connected to said phase locked loop circuit for distinguishing as binary data the frequency shifts of signals present in said phase locked loop circuit.

6. A receiver for data link arrangement communicating binary information and comprising:

radio frequency input means for receiving a radio frequency signal and for generating a control signal therefrom, a controlled oscillator for generating a signal of controllably variable frequency, a phase locked loop circuit operatively connected to said input means and said oscillator for receiving signals generated thereby and for controllably varying the frequency generated by said oscillator in response to said control signal and having programming means for selecting a channel of frequencies for operation of said data link means, said oscillator and said phase locked loop circuit cooperating to function as a frequency synthesizer, and data signal output means operatively connected to said phase locked loop circuit for distinguishing as binary data the frequency shifts of signals present in said phase locked loop circuit.

7. In the combination of a traveling unit, moving past spindle locations at which ends of yarn normally are formed along one or more textile yarn forming machines and having means responsive to certain operations such as formation of ends of yarn for signaling certain states of said operations such as an end down at a spindle location, with data link means having transmitter means and receiver means for communicating data concerning said operations, the improvement in said data link means wherein:

said transmitter means comprises:
first and second oscillators generating signals of predetermined first and second frequencies,
data signal input gates operatively connected to said oscillators for selectively passing signals of one of said frequencies and for frequency shift keying binary data,
a phase locked loop circuit operatively connected to said gates for receiving signals passed therethrough as a reference signal and for generating an output signal of a predetermined frequency correlated to said reference signal,
said oscillators and said phase locked loop circuit cooperating to function as a frequency synthesizer,
radio frequency output means operatively connected to said phase locked loop circuit for emitting a radio frequency signal in response to and at a frequency determined by said output signal from said phase locked loop circuit, and said receiver means comprises:
radio frequency input means for receiving a radio frequency signal and for generating a control signal therefrom,
a controlled oscillator for generating a signal of controllably variable frequency,
a receiver phase locked loop circuit operatively connected to said input means and said controlled oscillator for receiving signals generated thereby and for controllably varying the frequency generated by said controlled oscillator in response to said control signal,
said controlled oscillator and said receiver phase locked loop circuit cooperating to function as a receiver frequency synthesizer, and
data signal output means operatively connected to said receiver phase locked loop circuit for distinguishing as binary data the frequency shifts of signals present in said receiver phase locked loop circuit, and further wherein said phase locked loop circuits comprise programming means for selecting common channels of frequencies for operation of said data link means.

8. In the combination of an overhead supported traveling pneumatic cleaner, moving past spindle locations at which ends of yarn normally are formed along one or more textile yarn forming machines and having means responsive to certain operations such as formation of ends of yarn for signaling certain states of said operation such as an end down at a spindle location, with data link means having transmitter means and receiver means for continuously transferring data originating from the traveling pneumatic cleaner, the improvement in said data link means wherein
said transmitter means comprises:

first and second oscillators generating signals of predetermined first and second frequencies, data signal input gates operatively connected to said oscillators for selectively passing signals of one of said frequencies and for frequency shift keying binary data, a phase locked loop circuit operatively connected to said gates for receiving signals passed therethrough as a reference signal and for generating an output signal of a predetermined frequency correlated to said reference signal, said oscillators and said phase locked loop circuit cooperating to function as a frequency synthesizer, and radio frequency output means operatively connected to said phase locked loop circuit for emitting a radio frequency signal in response to and at a frequency determined by said output signal from said phase locked loop circuit, and said receiver means comprises:

radio frequency input means for receiving a radio frequency signal and for generating a control signal therefrom, a controlled oscillator for generating a signal of controllably variable frequency, a receiver phase locked loop circuit operatively connected to said input means and said controlled oscillator for receiving signals generated thereby and for controllably varying the frequency generated by said controlled oscillator in response to said control signal, said controlled oscillator and said receiver phase locked loop circuit cooperating to function as a receiver frequency synthesizer, and data signal output means operatively connected to said receiver phase locked loop circuit for distinguishing as binary data the frequency shifts of signals present in said receiver phase locked loop circuit, and further wherein said phase locked loop circuits comprise programming means for selecting common channels of frequencies for operation of said data link means.

9. A data link arrangement for communication of binary information and having:

transmitter means comprising:

first and second oscillators generating signals of predetermined first and second frequencies, data signal input gates operatively connected to said oscillators for selectively passing signals of one of said frequencies and for frequency shift keying binary data, a phase locked loop circuit operatively connected to said gates for receiving signals passed therethrough as a reference signal and for generating an output signal of a predetermined frequency correlated to said reference signal, said oscillators and said phase locked loop circuit cooperating to function as a frequency synthesizer, and radio frequency output means operatively connected to said phase locked loop circuit for emitting a radio frequency signal in response to and at a frequency determined by said output signal from said phase locked loop circuit, and receiver means comprising:

radio frequency input means for receiving a radio frequency signal and for generating a control signal therefrom, a controlled oscillator for generating a signal of controllably variable frequency, a receiver phase locked loop circuit operatively connected to said input means and said controlled oscillator for receiving signals generated thereby and for controllably varying the frequency generated by said controlled oscillator in response to said control signal, said controlled oscillator and said receiver phase locked loop circuit cooperating to function as a receiver frequency synthesizer, and data signal output means operatively connected to said receiver phase locked loop circuit for distinguishing as binary data the frequency shifts of signals present in said receiver phase locked loop circuit, and further wherein said phase locked loop circuits comprise programming means for selecting common channels of frequencies for operation of said data link means.

10. Apparatus according to one of claims 4 through 9 wherein said receiver phase locked loop circuit comprises programming means for selecting a center frequency for generation by said receiver phase locked loop circuit, and further wherein said receiver synthesizer functions to shift said receiver phase locked loop circuit to operating frequencies above and below said center frequency and indicative of binary data.

11. Apparatus according to one of claims 7 through 9 wherein said first and second oscillators generate signals separated by a predetermined frequency interval, said transmitter phase locked loop circuit comprises programming means for selecting a channel of frequencies encompassing said frequency interval, said radio frequency output means emits a radio frequency signal modulated between upper and lower frequencies as a function of binary data, said receiver phase locked loop circuit comprises programming means for selecting a center frequency for generation by said receiver phase locked loop circuit which is medial of frequencies corresponding to said frequency interval, and said receiver synthesizer functions to shift said receiver phase locked loop circuit to operating frequencies above and below said center frequency and indicative of binary data.

* * * * *